(12) United States Patent
Hille et al.

(10) Patent No.: US 7,531,614 B2
(45) Date of Patent: May 12, 2009

(54) FUNCTIONALIZED POLYURETHANE

(75) Inventors: Hans-Dieter Hille, Bergisch (DE); Karsten Jahny, Ludwigsburg (DE); Paul Lamers, Allison Park, PA (US)

(73) Assignee: PPG Industries Ohio Inc., Cleveland, OH (US)

( * ) Notice: Subject to any disclaimer, the term of this patent is extended or adjusted under 35 U.S.C. 154(b) by 0 days.

(21) Appl. No.: 10/509,218

(22) PCT Filed: Mar. 25, 2003

(86) PCT No.: PCT/DE03/00981

§ 371 (c)(1), (2), (4) Date: Mar. 10, 2005

(87) PCT Pub. No.: WO03/080694

PCT Pub. Date: Oct. 2, 2003

(65) Prior Publication Data

US 2005/0154177 A1  Jul. 14, 2005

(30) Foreign Application Priority Data

Mar. 27, 2002 (DE) ................. 102 14 028

(51) Int. Cl.
C08G 18/30 (2006.01)
C08G 18/40 (2006.01)
C08G 18/34 (2006.01)
C08G 18/77 (2006.01)
C08G 18/10 (2006.01)

(52) U.S. Cl. .............. 528/59; 528/85; 528/71; 528/60; 528/73; 524/839; 524/840; 524/591

(58) Field of Classification Search ........... 524/591, 524/839, 840; 528/71, 60, 85, 59, 73
See application file for complete search history.

(56) References Cited

U.S. PATENT DOCUMENTS

| 5,176,985 | A  | * | 1/1993 | Seitz et al. ............ 430/284.1 |
| 6,248,225 | B1 |   | 6/2001 | Palaika et al. |
| 6,429,256 | B1 | * | 8/2002 | Vandevoorde et al. ....... 524/591 |
| 2002/0086115 | A1 | * | 7/2002 | Lamers et al. ............ 427/385.5 |
| 2002/0114955 | A1 | * | 8/2002 | Lamers et al. ............ 428/423.3 |

FOREIGN PATENT DOCUMENTS

| DE | 19849208 | 4/2000 |
| EP | 0355682 | 2/1990 |
| EP | 0414099 | 2/1991 |

* cited by examiner

Primary Examiner—Rabon Sergent
Assistant Examiner—Benjamin Gillespie
(74) Attorney, Agent, or Firm—Robert A. Diaz

(57) ABSTRACT

Water-thinnable polyurethane with at least two free OH groups obtainable from a first conversion of a primary and/or secondary alkanolamine with a NCO compound giving an intermediate product, followed by the addition of a cyclic carboxylic anhydride to the intermediate product; with
- the NCO compound exhibiting at least one free NCO group and no blocked NCO group;
- all alkanolamine being converted during the first conversion to the intermediate product such that the nitrogen atom of the alkanolamine reacts with one of the free NCO groups of the prepolymer to form a urea bond; and
- the cyclic carboxylic anhydride reacting, with ring opening, with the OH group, originating from the alkanolamine, of the intermediate product;

and its use for the production of hot curing coating compositions.

17 Claims, No Drawings

FUNCTIONALIZED POLYURETHANE

The present invention relates to a new, water-thinnable polyurethane and its use for surface coating of series-produced motor vehicles.

BACKGROUND OF THE INVENTION

It is well known that polyurethanes can be used as binders for high quality coating compositions. The resulting coatings have excellent mechanical properties, particularly with regard to the resistance of the cured paint coat to mechanical stress.

Consequently, polyurethanes are frequently used in the manufacture of conventional motor vehicle paint coats.

Such a motor vehicle paint coat generally consists of a total of four different layers (quadruple layer structure). These four layers are applied one after the other in separate coating facilities.

The first layer which is present directly on the motor vehicle sheet metal consists of a layer applied by electrophoresis (electrocoat layer, cathodic electrodeposition layer) which is applied by electrodeposition coating—mainly cathodic dip coating (CDC)—for protection against corrosion and subsequently stoved.

The second coat, approximately 30 to 40 µm thick, which is present on top of the electrocoat layer, is a so-called filler layer which, on the one hand, provides protection against mechanical attack (protection against chipping) and, on the other hand, guarantees satisfactory top coat non-sag properties, i.e. it smoothes the rough surface of the blank motor vehicle body for subsequent top coating and fills small unevennesses. The paints used to produce this filler layer contain not only binders but also pigments. In this connection, the wettability of the pigments used influences the top coat non-sag properties of the multi-layer coating as a whole and also the gloss of the filler layer such as it is required by some motor vehicle manufacturers. The filler layer is largely produced by application by means of electrostatic high rotation bells and a subsequent stoving procedure at temperatures above 130° C.

The third layer present on the filler layer is the base coat layer which provides the desired colour for the motor vehicle body by means of corresponding pigments. The base coat is applied by the conventional spray method. The layer thickness of this conventional base coat layer is between approximately 12 and 25 µm, depending on the tint. Usually, this layer is applied in two process steps, particularly in the case of metallic paints. In a first step, the application takes place by means of electrostatic high rotation bells, followed by a second application by pneumatic atomisation. This layer is subjected to intermediate drying by infrared radiators and/or hot air convection (when an aqueous base coat is used). The fourth and uppermost layer which is present on the base coat layer is the clear coating layer which is usually applied by electrostatic high rotation bells in one application. It provides the motor vehicle body with the desired gloss and protects the base coat against environmental effects (UV radiator, salt water etc.)

Subsequently, the base coat layer and the clear coating layer are stoved together.

The fillers used for the manufacture of a multi-layer coating for the motor vehicle industry are still based to a large extent on solvents and reach a solids concentration of up to 60%. This high solids concentration guarantees an efficient application and consequently satisfactory top coat non-sag properties of the finished multi-layer coating. Examples of such conventional fillers are known from DE 33 37 394 A1.

As a rule, the stoving temperatures are between 155 and 165° C. Some motor vehicle manufacturers demand an additional so-called "overstoving stability" up to 190° C. This means that the mechanical properties, such as adhesion and resistance to chipping, must not be subject to major deterioration under these demanding stoving conditions.

In order to satisfy these requirements, the binder compositions of corresponding filler systems frequently consist of saturated polyesters in combination with highly alkylated melamine resins as crosslinking agents. Combinations with polyurethanes, in particular with blocked polyisocyanates, are also known. The blocking agent most frequently used for this purpose is methyl ethyl ketoxim. The advantage of using methyl ethyl ketoxim compared with other blocking agents consists of its favourable deblocking temperature, its volatility and its satisfactory availability. A disadvantage is its tendency towards yellowing which greatly restricts the suitability for use for light-coloured stoving enamels.

Although crosslinking with blocked polyisocyanates improves the resistance to chipping and the overstoving stability, the simultaneous use of melamine resins as crosslinking agents is essential in view of other important properties of the filler layer such as high suitability for rubbing down, resistance to chemical abrasion, e.g. vis-à-vis brake fluid. Moreover, the levelling properties and top coat non-sag properties are influenced positively by a combination of these two crosslinking agents.

However, such hybrid systems of blocked polyisocyanates and melamine resins cause problems with respect to the correct adjustment of their reactivity: whereas the deblocking reaction in the case of polyurethanes and the subsequent urethane formation reaction are promoted by basic catalysts, the crosslinking reaction of melamine resins can be accelerated only with acidic catalysts. Reciprocal negative influences are unavoidable.

Against the background of the solvents used in conventional fillers and the environmental problems connected therewith, increased developments can be observed in the field of water-thinnable fillers based on polyurethanes.

In order to make polyurethanes dispersible in water, carboxyl groups are incorporated into the molecule which—frequently at the end of the synthesis process—are converted into carboxylate anions by neutralisations with (preferably volatile) amines. Very frequently this incorporation of carboxyl groups is also effected by conversion with dimethylol propionic acid.

Examples of such water-thinnable fillers containing corresponding polyurethanes are known from EP 0 726 919 A1, EP 0 594 685 B1, EP 1 110 983 A2 und EP 1 110 987 A1.

In addition, polyurethanes with blocked isocyanate groups are disclosed in DE 199 30 555 C1, which polyurethanes are obtainable by using alkanolamines as chain extenders. In the case of this chain extension, the hydroxyl groups of the alkanolamine react with the NCO groups of the polyisocyanate forming a urethane bond.

SUMMARY OF THE INVENTION

In this case, too, the water dispersibility of the polyurethanes produced is achieved by incorporating carboxyl groups as a result of a conversion with dimethylol propionic acid and subsequent neutralisation.

However, it has been found that it is possible, on an industrial scale, to achieve a solids concentration of only up to approximately 50% with these water-thinnable filler compositions based on polyurethane. In comparison with conventional fillers, this difference results in a low application safety and a clearly visible deterioration of the resulting multi-layer coating, particularly with respective to the non-sag properties of the top coat.

With a view to further energy savings and a shortening of the process steps, there is, moreover, a requirement in the motor vehicle industry for a reduction in the filler stoving temperature from the present level of approximately 160° C. However, such fillers still need to exhibit an overstoving stability up to 190° C.

A reduction in the stoving temperature by increasing the reactivity of corresponding filler systems, e.g. by using more highly reactive melamine resins, leads to embrittlement under overstoving conditions, resulting in the complete loss of anti-chipping protection.

A reduction in the melamine resin content would have the disadvantage that the stability against chemical attack (e.g. by brake fluid) would be impaired.

A satisfactory protective function against chipping of a multi-layer coating in the field of series-produced motor vehicle coatings is obtained if both the conditions of the "single impact test" and those of the "multiple impact test" are satisfied. In the case of the so-called "single impact test", the fracture in the structure of the multi-layer coating is localised under the effect of an accurately defined mechanical stress. In the so-called multiple impact test", the resistance to mechanical stress of a fairly large surface of the finished coating is simulated under different mechanical stresses. Further details of both tests are given in the examples.

The task of the present invention consists of providing a polyurethane which can be used for the manufacture of water-thinnable filler compositions with a solids content of more than 50% by weight, in particular of more than 55% by weight, in the case of multi-layer coating of motor vehicle bodies, these water-thinnable filler compositions, at a stoving temperature of only 140° C., leading to the resulting filler layers which exhibit both the resistance to chipping and the overstoving stability required by the motor vehicle industry.

Moreover, the resulting multi-layer coating should not exhibit worse properties regarding their total characteristic level compared with those of the state of the art, particular with regard to application safety and resistance to yellowing of the filler layer and the top coat non-sag properties of the total structure.

According to the invention, this task is achieved by a water-thinnable polyurethane with at least two free OH groups obtainable from a first conversion of a primary and/or secondary alkanolamine with a NCO compound giving an intermediate product, followed by the addition of a cyclic carboxylic anhydride to the intermediate product; with the NCO compound exhibiting at least one free NCO group and no blocked NCO group;

all alkanolamine being converted during the first conversion to the intermediate product such that the nitrogen atom of the alkanolamine reacts with one of the free NCO groups of the prepolymer to form a urea bond; and the cyclic carboxylic anhydride reacting, with ring opening, with the OH group, originating from the alkanolamine, of the intermediate product.

Basically, all known isocyanates can be used as NCO compound. The only decisive factor for the selection of this NCO compound is that, after conversion with the alkanolamine, these isocyanates give products which are soluble in a solvent inert vis-à-vis isocyanates and/or in the melt and consequently accessible to subsequent reaction with the cyclic carboxylic anhydride.

With a view to a simpler synthesis, it is advantageous for the NCO compound to exhibit no OH group.

The NCO compound is converted into a functionalised polyurethane/urea compound in a second process step by conversion with at least one alkanolamine. Regarding this first conversion to the intermediate product, it should be noted that the term "all alkanolamine" should be understood to mean that the alkanolamine is converted in such a way that a content of free alkanolamine of less than 0.5% by weight, based on the solids content of the resin, is present in the reaction mixture containing the intermediate products.

The conversion of the starting components takes place in this case according to the well known methods of organic chemistry (compare e.g. Kunststoff-Handbuch, volume 7: Polyurethane, issued by Dr. Y. Oertel, Carl Hanser Verlag, Munich, Vienna 1983).

If necessary, the conversion is carried out in the presence of water-miscible and highly volatile solvents which are inert vis-à-vis isocyanates. Preferably, methyl ethyl ketone and/or acetone is used.

In order to achieve dispersibility in an aqueous medium, at least one cyclic carboxylic anhydride is added in a ring-opening manner to the hydroxyl groups originating from the alkanolamine. The quantity of cyclic carboxylic anhydride should be selected in such a way that the resulting acid number is between 10 and 50, preferably between 20 and 30.

The conversion of the polyurethane thus obtained into an aqueous dispersion takes place by neutralising the carboxyl groups by amines and/or amino alcohols. Examples of suitable compounds are ammonia, tertiary amines such as trimethylamine, triethylamine and/or amino alcohols such as dimethylethanolamine, diethylethanolamine, methyldiethanolamine or triethanolamine. The neutralisation can take place in an organic phase or an aqueous phase. Preferably, dimethylethanolamine is used as neutralising agent.

The water-thinnable polyurethane produced in this way is characterised in that it can be used in water-thinnable filler compositions having a solids concentration of more than 50% for a multi-layer coating in the motor vehicle industry. When using conventional crosslinking agents, filler compositions containing the polyurethane according to the invention provide layers at a stoving temperature of only 140° C. which possess both the resistance to chipping required by the motor vehicle industry and an excellent overstoving stability.

As shown by the examples, the resulting multi-layer coatings exhibit not only these excellent properties but simultaneously no deteriorated properties with respect to application safety and resistance to yellowing of the filler layer and the top coat non-sag properties in comparison with a conventional multi-layer coating of the state of the art.

To enhance the dispersibility in water, is may be advantageous to modify this NCO compound with nonionic, stabilising groups before conversion. Alkoxypoly(oxyalkylene) alcohols are particularly preferred for this purpose. Particularly suitable alkoxypoly(oxyalkylene) alcohols are selected from the group of monoalkylated polyethylene oxides such as those marketed under the trade name of PLURIOL® A from BASF.

DETAILED DESCRIPTION OF THE PREFERRED EMBODIMENTS

According to a preferred embodiment of the present invention, a prepolymer is used as NCO compound which is obtainable from the conversion of at least one polyol with at least one polyisocyanate giving a polyurethane prepolymer containing isocyanate groups. Examples of suitable polyols are saturated or olefinically unsaturated polyester polyols and/or polyether polyols with a number average molecular weight of 100 to 5,000, preferably 500 to 2,000. It is also possible to use small quantities of a carboxyfunctional polyol. By selecting suitable starting compounds for this prepolymer, the physico-technical properties of the resulting multi-layer coating can be adjusted correspondingly.

Preferably, the NCO compound can exhibit two free NCO groups. As a result, a narrower molecular weight distribution is achieved compared with polyfunctional compounds.

All suitable compounds can be used as alkanolamine. It should be noted that the alkanolamines used according to the invention exhibit a hydrogen atom bonded to the nitrogen atom. This includes, for example, 1-amino-3-propanol, 1-amino-2-propanol (isopropanolamine), 1-amino-4-butanol, 1-amino-5-pentanol, 1,1'-iminodi-2-propanol (diisopropanolamine) and/or 2-(2-amino ethoxy) ethanol.

Tertiary alkanolamines should not be used according to the meaning of the present invention.

Preferably, those alkanolamines are used in the case of which at least one OH group of the alkanolamine is joined to the nitrogen atom via a substituted or unsubstituted alkyl group with 2 to 6 carbon atoms in the main chain.

As examples, aminobutanol, 1-amino-5-pentanol, aminohexanol, 2-(2-aminoethoxy) ethanol, isopropanolamine, diisopropanolamine, 2-amino-2-methyl-1-propanol and 2-amino-2-methyl-1,3-propandiol deserve to be mentioned.

In particular, the OH groups originating from the alkanolamine can be entirely or partially secondary. Examples of such compounds are isopropanolamine and diisopropanolamine.

Other alkanolamines with the primary OH groups can also be used such as e.g. N-(2-aminoethyl) ethanolamine and/or butylethanolamine.

Particularly preferably, diethanolamine and/or diisopropanolamine are used as alkanolamine for the production of the polyurethane according to the invention.

With a view to a satisfactory dispersibility in water, the polyurethane according to the present invention ought to have an acid number of at least 10 mg KOH/g, in particular of at least 20 mg KOH/g.

The number average molecular weight of the polyurethane according to the invention is preferably between 500 and 10,000, particularly between 1,000 and 4,000.

The cyclic carboxylic anhydride can be selected from the group of phthalic anhydride, hexahydrophthalic anhydride, tetrahydrophthalic anhydride, methyl hexahydrophthalic anhydride, succinic anhydride and maleic anhydride.

Particularly preferably, trimellitic anhydride is used as cyclic carboxylic anhydride.

According to a further object of the invention which is also claimed, the water-thinnable polyurethane described above is used in combination with a melamine resin for the production of hot curing coating compositions. Basically, all suitable crosslinking agents can be used for this purpose.

Highly alkylated melamine resins which are compatible with the polyurethane according to the invention are particularly preferred. Melamine resins without NH groups, in particular hexamethoxymethyl melamine (HMMA), are particularly preferred for this purpose.

Such coating compositions can be crosslinked at a temperature of more than 180° C. which represents a satisfactory overstoving stability according to the meaning of the present invention.

Insofar as no overstoving stability is required for the application of a coating composition containing the polyurethane according to the invention, it is also possible to use highly reactive melamine resins in order to reduce stoving temperature below 140° C. Such highly reactive melamine resins are marketed by BASF, for example, under the name of LUWIPAL® 062.

The water-thinnable polyurethanes described above are used in particular for the production of coating compositions in the motor vehicle industry, particularly preferably for filler compositions.

The application of the filler layers generally takes place by spray coating processes, e.g. by means of compressed air, hot or airless spraying or by electrostatic coating processes, e.g. by means of rapidly rotating bells (mini bells), by electrostatic automatic or manual spray guns with air support or by rollers, e.g. in the coil coating process.

The following examples serve the purpose of explaining the invention without restricting the latter thereto:

EXAMPLE 1

Production of a Polyurethane According to the Invention:

Production of a Polyester Diol (A):

In a glass flask with a volume of 4 l equipped with a stirrer, a packed column and a reflux condenser as well as a temperature measuring facility for the reaction mixture and the column head, the following starting products were weighed in: 1730 g of hexane diol-1,6 and 1622 g of isophthalic acid. The reaction mixture was melted at a temperature of 120° C. and the reaction temperature was subsequently increased to 230° C. within four hours. The increase in temperature was controlled by measuring the head temperature of the packed column. The head temperature was restricted to a maximum of 99° C. The melt was condensed for 12 hours at a temperature of 230° C. until the acid number had fallen to a value of 2 mg $_{KOH}$/g $_{solid\ resin}$. Subsequently, the reaction product was maintained for one hour at a temperature of 180° C. under vacuum. The number average molecular weight, determined by calculation, is 614 g/mole.

Production of the Polyurethane Dispersion:

Into a glass flask with a volume of 4 l, equipped with a stirrer, a reflux condenser and a temperature measuring facility, 850.0 g of the polyester diol (A) and 409.8 g of isophorone diisocyanate, 839.8 g of methyl ethyl ketone and 2.0 g of dibutyl tin dilaurate were introduced and heated with stirring to 80° C. and the reaction was continued until the NCO content had reached a constant value. Subsequently, the resin solution was cooled to 40° C. and 96.9 g of diethanolamine were added. The molar ratio of isocyanate to diethanolamine was 1:1 for this example. After the exothermic reaction had died down, the temperature was increased to 80° C. within half an hour. Half an hour after reaching the temperature, 57,6 g of trimellitic anhydride were added. After a reaction period of one hour, 53.4 g of dimethylethanolamine and 2766.4 g of deionised water were metered in, as a result of which the temperature did not fall below 60° C. After removing the methyl ethyl ketone under vacuum, a stable, opaque dispersion with a solids concentration of 43% was obtained.

EXAMPLE 2

Production of a Polyurethane According to the Invention:

Production of a Polyester Diol (B):

Into a glass flask with a volume of 4 l, equipped with a stirrer, a water separator and a reflux condenser as well as a temperature measuring facility for the reaction mixture, the following starting products were weighed in: 1918.8 g of 2,2-bis-[p-(β-hydroxytriethoxy)phenyl] propane, 431.6 g of isophthalic acid and 200 g of xylene. The temperature of the reaction mixture was raised with stirring within two hours to a reaction temperature of 180° C. It was raised every hour by 10° C. to 210° C. The melt was then condensed for 12 hours at a temperature of 230° C. until the acid number had fallen to a value of 2 mg KOH/g. Subsequently, the reaction product was maintained at a temperature of 180° C. for one hour under vacuum. The number average molecular weight, determined by calculation, is 1736 g/mole.

Production of the Polyurethane Dispersion:

Into a glass flask with a volume 4 l, equipped with a stirrer, a reflux condenser and a temperature measuring facility, 1041.6 g of polyester diol (B) and 266.4 g of isophorone diisocyanate, 872 g of methyl ethyl ketone and 2.0 g of dibutyl tin dilaurate were introduced and heated with stirring to 80° C. and the reaction was continued until the NCO content had reached a constant value. Subsequently, the resin solution was cooled to 40 ° C. and 94.4 g of diethanolamine were added. The molar ratio of isocyanate to diethanolamine was 1 to 0.75 for this example. After the exothermic reaction had died down, the temperature was raised to 80° C. within half an hour. Half an hour after reaching the temperature, 57.6 g of trimellitic anhydride were added. After a reaction period of one hour, 53.4 g of dimethylethanolamine and 1858.2 g of deionised water were metered in, as a result of which the temperature did not drop below 60° C. After removing the methyl ether ketone under vacuum, a stable, opaque dispersion with a solids concentration of 45% was obtained.

EXAMPLE 3.1

Production of a Pigment Paste:

The following components were weighed into a stirred vessel of stainless steel in the sequence indicated and homogenised after each addition by stirring: 443.6 g of the polyurethane dispersion from example 1, 7.7 g of Surfynol 104E (wetting and dispersion additive), 15.7 g of Additol XL 250, 13.0 g of Drewplus, 7.7 g of Aerosil R 972 (Degussa), 433 g of barium sulphate (Blanc Fixe® micro), 49.5 g of titanium dioxide (Tiona RCL 628), 23.5 g of Printex G, 26 g of talcum IT extra and 66.7 g of deionised water. The mixture was predispersed for thirty minutes in a dissolver and subsequently ground on a sand mill to a grain size of <10 µm. The temperature was kept below 40° C. during the grinding process.

EXAMPLE 3.2

Production of a Pigment Paste:

The following components were weighed into a stirred vessel of stainless steel in the sequence indicated and homogenised after each addition by stirring: 423.8 g of the polyurethane dispersion from example 2, 7.7 g of Surfynol 104E (wetting and dispersion additive), 15.7 g of Additol XL 250, 13.0 g of Drewplus, 7.7 g of Aerosil R 972 (Degussa), 433 g of barium sulphate (Blanc Fixe® micro), 49.5 g of titanium dioxide (Tiona RCL 628), 23.5 g of Printex G, 26 g of talcum IT extra and 86.5 g of deionised water. The mixture was predispersed for thirty minutes in a dissolver and subsequently ground on a sand mill to a grain size of <10 µm. The temperature was kept below 40° C. during the grinding process.

EXAMPLE 4.1

Production of a Filler Formation According to the Invention:

The filler was produced by mixing 523 g of the pigment paste according to example 3.1 and 343 g of the polyurethane dispersion from example 1 with 122.4 g of a highly alkylated low-molecular melamine resin etherified with methanol, 26 g of N-methyl pyrrolidone and 13 g of an aliphatic hydrocarbon mixture with a boiling point of 180° C. and 210° C., as well as 6.5 g of BYK 381 (flow additive, BYK-Chemie). The viscosity was adjusted to 120 mPas with deionised water at a rate of shear of 1000 $s^{-1}$ using a rotation viscosimeter. The solids concentration was 55%.

EXAMPLE 4.2

Production of a Filler Formation According to the Invention:

The filler was produced by mixing 523 g of the pigment paste according to example 3.2 and 304 g of the polyurethane dispersion from example 2 with 122.4 g of a highly alkylated low-molecular melamine resin etherified with methanol, 26 g of N-methyl pyrrolidone and 13 g of an aliphatic hydrocarbon mixture with a boiling point of 180° C. and 210° C., as well as 6.5 g of BYK 381 (flow additive, BYK-Chemie). The viscosity was adjusted to 125 mPas with deionised water at a rate of shear of 1000 $s^{-1}$ using a rotation viscosimeter. The solids concentration was 54%.

EXAMPLE 4.3

Production of a Filler Formulation not Corresponding to the Invention:

The production took place in a manner analogous to example 4.2, the commercial polyurethane dispersion Resydrol VAZ 6600 from Solutia being used, instead of the polyurethane dispersion from example 2, both for the filler composition and for the production of the pigment paste. The solids concentrations obtained was 48% with a viscosity of 125 mPas (rate of shear of 1000 $s^{-1}$).

Application of the Filler:

For the manufacture of the multi-layer coating, common and known test coupons of steel were used which were coated with an electrocoating of a thickness of 20 µm, produced from a commercial cationic electrodeposition paint.

The test coupons were coated pneumatically with the fillers according to example 4.1, 4.2 and/or 4.3. The resulting filler layers were pre-dried for eight minutes at 80° C. and subsequently stoved for twenty minutes at 140° C., 160° C. and 190° C. A filler layer with a layer thickness of 35±2 µm was obtained.

Onto the filler layer, a commercial, conventional single colour top coat was applied pneumatically and, after a ten minute evaporation time at room temperature stoved for 30 min at 140° C. The single colour top coat of the resulting multi-layer coating has a layer thickness of 30 µm.

The multi-layer coatings produced in this way were examined in line with the tests described in the following. The results of the investigations are summarised in the following tables:

The mechanical properties are given in Table I whereas Table II shows the effects of overstoving conditions.

Determination of the Solids Concentration:

The determination of the solids was carried out in a circulating air oven by stoving at a temperature of 120° C. For this purpose, 1 g of the substance to be tested was applied onto lever lids (diameter 75 mm), evenly distributed over the surface and dried for one hour in the oven. The non-volatile portion was subsequently determined by reweighing the lids. A triple determination was carried out.

Determination of the Layer Thickness:

The determination of the layer thickness was carried out by using the Surfix device from Phynix.

Determination of the Degree of Gloss:

The determination of the degree of gloss was carried out using the haze-gloss device from BYK Gardner at an angle of 20° and/or 60°.

Testing for Resistance to Chipping (Multiple Impact Test):

Testing for resistance to chipping took place using a chipping test device according to VDA, Model 508 from Erichsen GmbH+Co KG.

The test panels were shot at twice with 500 g of quenched, angular "diamond" iron shot, size 4-5 mm, at a pressure of 2 bar.

Testing for Resistance to Chipping According to BMW (Single Impact Test):

The determination was carried out in line with the BMW test instruction PA 15063-L of April 1997. For this purpose, a conical test body in line with the draft VDA test sheet 621-428 was shot at a pressure of 2 bar onto the finished multi-layer coating. The flaking and the fracture sites in the structure were determined.

Determination of the Pendulum Hardness According to König

The pendulum hardness was determined using a pendulum hardness tester from BYK-Gardner.

The values given in Table I make it clear that the filler produced by using the crosslinking agent according to the invention exhibits improved properties with respect to the solids concentration of the ready-to-use filler formulation, the resistance to chipping and the top coat non-sag properties of the finished multi-layer coating, compared with the fillers of the state of the art.

Table II makes it clear that this superiority is guaranteed also under overstoving conditions.

The invention claimed is:

1. A coating composition consisting of: a water-thinnable polyurethane with at least two free OH groups obtained from the reactions consisting of: a first conversion of a primary and/or secondary alkanolamine with a NCO compound giving an intermediate product, followed by the addition of a cyclic carboxylic anhydride to the intermediate product; wherein the NCO compound has at least one free NCO group and no blocked NCO group, and the NCO compound is obtained by reacting at least one polyol with at least one polyisocyanate, in which the polyol is saturated polyester polyol or saturated polyether polyol; all alkanolamine being converted during the first conversion to the intermediate product such that the nitrogen atom of the alkanolamine reacts with one of the free NCO groups of the NCO compound to form a urea bond; and the cyclic carboxylic anhydride reacting, with ring opening, with the OH group, originating from the alkanolamine, of the intermediate product and wherein the coating composition further consists of a crosslinking agent that is reactive with the water-thinnable polyurethane, the crosslinking agent consisting of a melamine resin wherein the melamine resin is one without NH groups.

2. The coating composition according to claim 1 wherein the NCO compound does not exhibit any OH group.

3. The coating composition according to claim 1 wherein the NCO compound is modified by at least one alkoxypoly (oxyalkylene) alcohol.

TABLE I

|  | Example 4.2 Comparative example according to the invention | Example 4.3 Comparative example not according to the invention |
|---|---|---|
| Solids concentration | 54% | 48% |
| Non-sag properties of the top coat[a] | 2 | 2 |
| Gloss (20°/60°) | 78/89 | 70/90 |
| Hardness according to König (sec.) for 160° C. | 142 | 149 |
| Resistance to chipping (VDA) | 2 | 4 |
| BMW chisel (flaking in mm/separation level) | 1/cohesive | 3/adhesive |

TABLE II

|  | Example 4.1 Comparative example according to the invention | Example 4.3 Comparative example not according to the invention |
|---|---|---|
| Solids concentration | 55% | 48% |
| Non-sag properties of the top coat[a] | 2 | 2 |
| Gloss (20°/60°) | 69/89 | 70/90 |
| Hardness according to König (sec.) for (140/160/190° C.). | 124/137/145 | 84/148/154 |
| Resistance to chipping VDA (140° C./160° C./190° C.) | 2.5/2.0/2.5 | 2.5/4.0/4.5 |

[a]visual assessment

4. The coating composition according to claim 1 wherein the NCO compound is a prepolymer.

5. The coating composition according to claim 1 wherein the NCO compound exhibits at least two free NCO groups.

6. The coating composition according to claim 1 wherein at least one OH group of the alkanolamine is linked with its nitrogen atom via a substituted or non-substituted alkyl group with 2 to 6 carbon atoms in the main chain.

7. The coating composition according to claim 1 wherein OH groups originating from the alkanolamine are fully or partially secondary.

8. The coating composition according to preceding claims characterised in that claim 1 wherein alkanolamine is diethanolamine and/or diisopropanolamine.

9. The coating composition according to claim 1 wherein it has an acid number of at least 10 mg KOH/g, in particular of at least 20 mg KOH/g.

10. The coating composition according to claim 1 wherein the polyurethane has a number average molecular weight of between 500 and 10,000, in particular between 1,000 and 4,000.

11. The coating composition according to claim 1 wherein the cyclic carboxylic anhydride is selected from the group of phthalic anhydride, hexahydrophthalic anhydride, tetrahydrophthalic anhydride, methyl hexahydrophthalic anhydride, succinic anhydride and maleic anhydride.

12. The coating composition according to claim 1 wherein the cyclic carboxylic anhydride is trimellitic anhydride.

13. The coating composition according to claim 1 wherein the melamine resin is a highly alkylated melamine resin.

14. The coating composition according to claim 1 wherein the crosslinking temperature of the coating composition is less than 145° C.

15. The coating composition according to claim 1 wherein the crosslinking temperature of the coating composition is more than 180° C.

16. The coating composition according to claim 2 wherein the NCO compound is modified by at least one alkoxypoly (oxyalkylene) alcohol.

17. The coating composition according to claim 13 wherein the melamine resin is hexamethoxymethyl melamine.

* * * * *